United States Patent

[11] 3,596,349

[72] Inventors Roger W. Boom
Woodland Hills;
Luther Carlton Salter, Jr., Los Angeles;
James B. Vetrano, Woodland Hills, all of, Calif.

[21] Appl. No. 763,437
[22] Filed May 2, 1968
Division of Ser. No. 369,205, May 21, 1964, abandoned
[45] Patented Aug. 3, 1971
[73] Assignee North American Rockwell Corporation

[54] METHOD OF FORMING A SUPERCONDUCTING MULTISTRAND CONDUCTOR
5 Claims, 6 Drawing Figs.

[52] U.S. Cl. ........ 29/599, 29/419, 335/216
[51] Int. Cl. ........ H01v 11/00
[50] Field of Search ........ 29/599, 527.1, 419; 335/216

[56] References Cited

UNITED STATES PATENTS

| | | | |
|---|---|---|---|
| 3,109,963 | 11/1963 | Geballe | 317/123 |
| 3,277,564 | 10/1966 | Webber et al. | 29/419 |
| 3,218,693 | 11/1965 | Allen et al. | 29/599 |
| 3,370,347 | 2/1968 | Garwin et al. | 29/599 |

*Primary Examiner*—John F. Campbell
*Assistant Examiner*—D. C. Reiley
*Attorney*—L. Lee Humphries

ABSTRACT: A method of fabricating a unitary superconducting multistrand conductor. The method includes coating a plurality of fine superconducting wires with a normal metal having ductility characteristics similar with those of the superconducting metal, assembling the coated wires in a close-packed array, and swagging the array so that the metal coatings of the wires form a conductive continuous matrix in which the wires are solidly embedded.

INVENTORS
ROGER W. BOOM
LUTHER CARLTON SALTER, JR.
JAMES B. VETRANO

BY [signature]
ATTORNEY

METHOD OF FORMING A SUPERCONDUCTING MULTISTRAND CONDUCTOR

This is a division of application, Ser. No. 369,205, filed May 21, 1964, now abandoned.

The present invention relates to a superconducting multistrand conductor, and more particularly to a multistrand superconducting magnet which can carry larger currents than a single wire conductor of equivalent diameter.

Superconductivity is the property of certain materials at cryogenic temperatures approaching absolute zero to carry extremely large currents in strong magnetic fields without power dissipation. Such materials, at temperatures below a certain critical temperature, T , have no electrical resistivity, and therefore no $I^2R$ losses. This phenomenon has been experimentally verified. Coils of such materials in liquid helium baths, with currents induced by such means as withdrawing a permanent magnet from within the coil, have carried the resulting currents for periods of two years without any detectable voltage drop. The factors affecting superconductivity of such materials are the interrelation of magnetic field strength H, critical current density $J_c$, and critical temperature $T_c$. The magnetic field strength, applied externally or generated by a current in the superconductor, limits superconductivity to below certain temperatures and current densities. Similarly, at a given field strength, an increase in temperature and/or current density can terminate superconductivity. The large current-carrying capacity or superconductors provides the basis for very compact, extremely powerful magnets which can be used in numerous applications where strong magnetic fields are required, for example, in lasers, masers, accelerators, and bubble chambers.

Since the field generated by a superconducting magnet is proportional to both the current carried by the superconducting wire and the number of turns of superconducting wire 30-mil the solenoid, it would appear that large diameter superconducting wire might be utilized. Large diameter superconducting wires might also find use in the transmission of large electrical loads between two points without power dissipation. It has been found, however, for reasons not thoroughly understood but perhaps involving both basic solid-state physics of superconductivity and the metallurgy of superconducting wire fabrication, that the current-carrying capacity of superconducting wire is not directly proportional to the cross section area of the wire but is more nearly proportional to its diameter. For example, a 10-mil wire of a given composition may carry 50 amps., whereas a similar 30-mill wire will carry 150 amps. Superconductivity therefore seems to involve a surface conduction or bulk effect phenomenon. The fabrication of large diameter, large current-carrying superconducting magnets has, accordingly, been considered unfeasible and economically unattractive because of the high cost of the wire.

In order to obtain high field superconducting magnets, resort has been had to the use of long lengths, running to the thousands of feet, of small diameter wires, for example 10 mils. The cost of manufacturing superconducting wire increases with the length of a given continuous section, due to difficulties in manufacturing very long lengths of the relatively brittle wire. However, joining a number of shorter sections in a continuous loop is not an entirely satisfactory alternative, because the joints between such sections have a greater tendency to undergo superconducting/normal transitions, and unless the entire solenoid is superconducting, a persistent flow of current will not be maintained.

It is an object of the present invention, therefore, to provide a relatively large diameter superconducting wire capable of carrying large currents.

Another object of the present invention is to provide a multistrand superconducting wire.

It is another object to provide a multistrand superconducting magnet capable of carrying large persistent currents.

Another object is to provide a superconducting multistrand conductor in a solenoid configuration which has little tendency to undergo superconducting/normal transitions, and which can rapidly recover from localized transistions, without disturbing the overall superconducting condition of the solenoid.

Still another object is to provide means in such a conductor for heat conduction away from, and electrical transmission around, a point in which a superconducting/normal transition has occurred, thereby allowing rapid recovery of such point to a superconducting state.

A further object is to provide a relatively rapid and economical method of fabricating such a superconducting multistrand conductor.

A still further object is to provide a high energy, low inductance magnet which can discharge its energy rapidly, for example, a millisecond energy source.

The above and other objects and advantages of the present invention will become apparent from the following detailed description and the appended drawings.

Figures 1, 2, 3, 4, 5, 6:
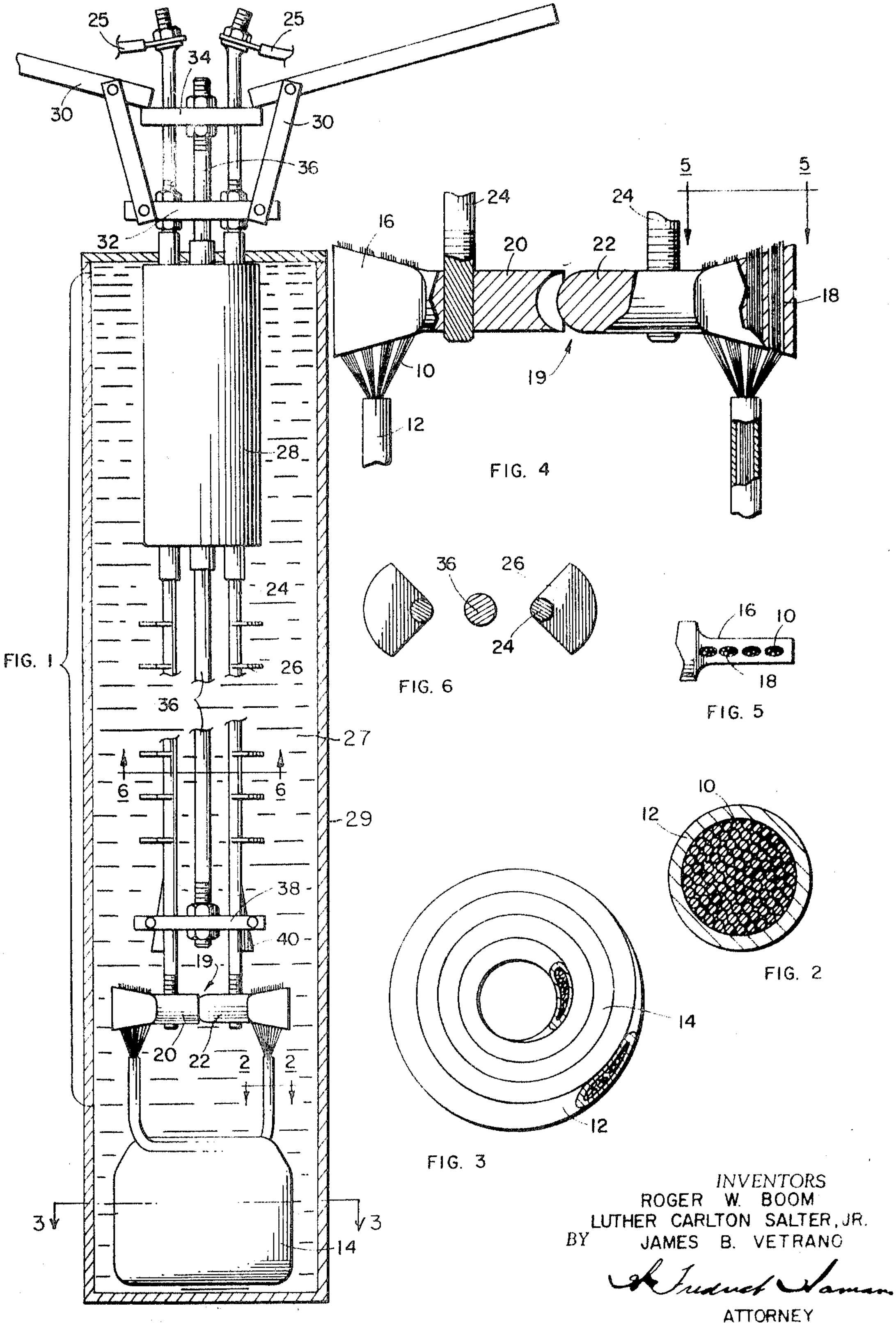
FIG. 1 is an overall perspective view of one embodiment of the present superconducting magnet.
FIG. 2 is an enlarged section through the multistrand conductor showing the individual wires and enclosing sheath.
FIG. 3 is an enlarged section through 3–3 of FIG. 1 showing the superconducting solenoid.
FIG. 4 is an enlarged fragment, partly in section, illustrating the relationship between the termination of the superconducting wire assembly, the persistence switch, and the leads from the power source.
FIG. 5 is a plan view from 5–5 of FIG. 4 showing the termination of the superconducting wire assembly.
FIG. 6 is a section through 6–6 of FIG. 1 showing a cooling fin arrangement for the power leads to the superconducting solenoid.

It is found that the present superconducting multistrand conductor will carry much greater currents than a single superconducting wire of equivalent diameter. In one experiment, for example, 2,000 amps. were carried in the superconducting state, and the limitation was the power supply capacity. There were no proximity effects whereby the field of one wire affected another to degrade current. Further, the plurality of small diameter wires tends to diminish the frequency and extent of superconducting/normal transitions in the resulting conductor. It is believed that if one small wire is momentarily driven normal, the current jumps to the next small wire. Current conduction is thus not blocked, little energy is released, and fast recovery is achieved through cooling the wire back to a superconducting temperature. Such brief superconducting/normal transitions may be caused by flux jumps between the fine wires which induce eddy currents opposing current flow. As a result, superconducting/normal transitions occur on a microscopic rather than macroscopic scale, do not detrimentally affect overall operation of the magnet, and thus the magnet has less tendency to experience gross superconducting/normal transitions which terminate the flow of persistent current.

The bundle of superconducting wires may be arranged in various physical configurations to give the resulting large single conductor. A particularly advantageous arrangement is shown in FIG. 2, wherein a very large number of fine superconducting wires are assembled in a close-packed configuration. In this embodiment, a large number of fine superconducting wires 10, for example 10-mil Nb-Zr or Nb-Ti, each coated with a normal metal (i.e., nonsuperconducting) of low thermal and electrical resistance, are placed in a normal metal tube 12 of like properties and reduced to a smaller diameter so that the resulting conductor is a tightly packed cylinder of mutually touching wires in a normal metal matrix. Such a packing technique insures a thermally and electrically continuous normal metal matrix of good thermal and electrical conductivity, and gives a more compact conductor and hence a greater volumetric magnetic field.

The matrix of normal metal jacketing and wire coating also serves a very important cooling function. Heat generated by a superconducting/normal transition as a result of the voltage induced by the collapsing magnetic field occasioned by such transition is rapidly conducted away, which then permits the wire to again reach the very low temperature (e.g. 9° K. for Nb-Zr) necessary for resumption of the superconducting state. While the normal metal chosen for coating the individual wires and the outer tube should be a good thermal and electrical conductor, electrical current is not drawn away from the superconducting wires since the small resistance of the normal metal is infinite in comparison with the zero resistance of the superconducting wires; it becomes an effective low resistance shunt when the superconductor is driven normal. Copper and silver are very satisfactory choices for the coating and tube metals.

The large cross section superconducting wire 10 consists, as seen in FIG. 2, of 86 wires of 10-mill Nb-25Zr, each copper electroplated, which are inserted into a ¼-inch copper tube 12 with 0.06-mil wallsize. The tube is swaged to a diameter of 0.2 inch, which results in a cylinder of tightly packed Nb-Zr wires in a copper matrix. Twenty feet of conductor so formed are wound into a cylindrical magnet structure 14, 1 inch ID × 2½ inches long × 2½ OD having four layers and nine turns per layer (FIGS. 1 and 3). The strands 10 of the Nb-Zr conductor emerge from copper sheath 12 at the ends of solenoid 14 in order to make electrical contact with the incoming electrical current and the persistence switch. Multistrand contact is made with superconducting member 16, of Nb or NB-Zr, by pressing the wires in drilled holes 18 in joint 16. The wires are divided into four separate bundles, passed through holes 18 in member 16, as seen in FIGS. 4 and 5, and cold-pressed at about 40 tons.

The persistence switch 19 is made by the Nb-Zr wire connection through blocks 16. The blocks are machined and lathed, and pressed together to form two mating hemispherical surfaces 20 and 22 (FIG. 4). The switches are opened and closed mechanically, as described below, and in their closed position a persistent current is maintained in the solenoid structure 14 by effectively shorting out external current being supplied through the large diameter copper conductors 24 which terminate in the switch. (Closing switch 19, followed by shutting off the external power source, traps the current in the closed superconducting circuit of the magnet and persistence switch, since the resistance of copper conductor 24 to the external power source is infinite in comparison with that of the superconducting persistence switch.)

The copper rods 24 which connect the superconducting magnet with the power source at leads 25 have a plurality of copper cooling fins 26 (FIGS. 1 and 6) and pass through a chamber 28 which contains liquid nitrogen. The cooling means dissipates heat generated in conductor 24 by the passing of very large current, e.g. 2,000 amps., and prevents distortion of the conductors and boiling of the liquid helium bath 27 which is disposed in container 29, in which the entire structure, from solenoid 14 to the top of nitrogen chamber 28, is inserted for superconducting operation. A pair of hinged arm linkages 30 are provided for opening and closing the persistence switch; they pivotally connect to crossbar 32 and engage crossbar 34. Bringing the arms 30 together in a closing operation depresses bar 34 onto which a rod 36 extending along the axis of the magnet structure is attached. At the other end rod 36 engages a crossbar 38 which rides on the inclined surfaces or cams 40. The movement of bar 38 along the cam surfaces draws the conducting rods 24 closer together and hence brings mating surfaces 20 and 22 into engagement. It is apparent that equivalent switches and means of operating such switches may be made by those skilled in the art.

A magnet of the above design has carried 1,600 amps., in a persistent manner, and has generated a magnetic field of 8 Kgauss. In comparison a superconducting magnet of the same dimensions and materials, but being composed of a single large superconducting wire of the same diameter, would carry about 400 amps., and produce a field of only 2 Kgauss. The magnet had an inductance of 60 microhenries which allows for rapid discharge, depending on the load, and permits the magnet to be used for purposes where a capacitor bank would be used for storage and rapid discharge.

While the present invention has been described with respect to a particular embodiment, it should be understood that variations may be made by those skilled in the art within the scope of the invention, and that the description is illustrative rather than restrictive of the invention. The present invention should be understood to be limited, therefore, only as is indicated in the appended claims.

What we claim is:

1. A method of forming a large diameter unitary superconducting multistrand conductor capable of carrying large supercurrents which are substantially greater than can be carried by a single superconducting wire of equivalent diameter while remaining substantially free from superconducting/normal transitions, said multistrand conductor consisting of a plurality of close-packed Nb-Zr or Nb-Ti superconducting wires spaced from each other and solidly embedded in a thermally and electrically c6nductive continuous matrix of copper or silver, which comprises providing a plurality of fine copper-coated or silver-coated superconducting wires of ductile niobium-zirconium or niobium-titanium alloy having substantially similar ductility characteristics as the metal coating so as to form a substantially monolithic nonseparable unitary body when pressed together, assembling said coated wires in a closed-packed wire array, and swaging said close-packed wire array in a single operation to a smaller cross section sufficient to bring said wires into intimate contiguous contact so that the metal coatings of said wires form a thermally and electrically conductive continuous matrix in which said superconducting wires are solidly embedded.

2. 1,000 method of claim 1 wherein superconducting wires are of about 1-mil diameter and the resultant formed wire has a supercurrent-carrying capacity of at least 1,000 amperes.

3. The method of claim 1 wherein said metal coating and the formed matrix are of copper.

4. A method of forming a large diameter unitary superconducting multistrand conductor capable of carrying large supercurrents which are substantially greater than can be carried by a single superconducting wire of equivalent diameter while remaining substantially free from superconducting/normal transitions, said multistrand conductor consisting of a plurality of close-packed Nb-Zr or Nb-Ti superconducting wires spaced from each other and solidly embedded in a thermally and electrically conductive continuous matrix of copper of silver, which comprises providing a plurality of fine copper-coated or silver-coated superconducting wires of ductile niobium-zirconium or niobium-titanium alloy having substantially similar ductility characteristics as the metal coating so as to form a substantially monolithic nonseparable unitary body when pressed together, assembling said coated wires in a close-packed wire array in a thin-walled metal tube of the same metal as the coating, and swaging the wire assembly in a single operation to a smaller cross section sufficient to bring said wires and said metal tube into intimate contiguous contact so that the metal coating of said wires and the metal tube form a thermally and electrically conductive continuous matrix in which said superconducting wires are solidly embedded.

5. The method according to claim 4 wherein said superconducting wires are copper coated and of about 1-mil diameter, said metal tube is of copper, and the resultant formed wire has a supercurrent-carrying capacity of at least 1,000 amperes.